United States Patent [19]
Vachek

[11] Patent Number: 4,507,971
[45] Date of Patent: Apr. 2, 1985

[54] HYDRAULIC FILTER FOR ELIMINATING SLOW PRESSURE FLUCTUATIONS

[75] Inventor: Josef Vachek, Überlingen-Hödingen, Fed. Rep. of Germany

[73] Assignee: Bodenseewerk Geratetechnik GmbH, Bodensee, Fed. Rep. of Germany

[21] Appl. No.: 593,425

[22] Filed: Mar. 26, 1984

Related U.S. Application Data

[63] Continuation of Ser. No. 287,937, Jul. 29, 1981, abandoned.

[30] Foreign Application Priority Data

Jul. 29, 1980 [DE] Fed. Rep. of Germany ....... 3028657

[51] Int. Cl.$^3$ ............................ G01L 7/08; G01L 9/00
[52] U.S. Cl. ....................................... 73/707; 73/723; 73/744; 73/756

[58] Field of Search ................. 73/707, 706, 744, 701, 73/723, 724, 725, 726, 727, 728, 756, 717–722; 137/86; 138/26, 30, 37, 40, 44, 46, 128

[56] References Cited

U.S. PATENT DOCUMENTS 2,984,109  5/1961  Savage, Jr. et al. .................. 73/744

Primary Examiner—Donald O. Woodiel
Attorney, Agent, or Firm—Lee, Smith & Zickert

[57] ABSTRACT

A hydraulic accumulator unit having a volume variable against the force of a spring and a restrictor are provided for eliminating slow pressure fluctuations in a measuring instrument responsive to fluid pressure, through which restrictor the hydraulic accumulator unit is connected to the fluid subjected to the pressure fluctuations. The measuring instrument measures the pressure in the accumulator unit.

4 Claims, 5 Drawing Figures

HYDRAULIC FILTER FOR ELIMINATING SLOW PRESSURE FLUCTUATIONS

This is a continuation application of my application Ser. No. 06/287,937 filed July 29, 1981, now abandoned.

The invention relates to a hydraulic filter for eliminating slow pressure fluctuations by means of a restrictor.

Such filters may be used, for example, in instruments determinating the depth of waters from the hydrostatic pressure. The pressure in the depth is the sum of the static pressure and the pressure fluctuations caused by surface undulation.

It is known to reduce fast pressure fluctuations by means of a restrictor in front of the pressure measuring instrument proper. These prior art apparatus, however, are not able to eliminate slow pressure fluctuations.

In principle, it is also possible to electrically eliminate pressure fluctuations which are represented as an analogue a.c. voltage signal by a pressure measuring instrument. In very slow pressure fluctuations, electric or electronic filtering requires very large electric accumulators to be used. Such accumulators are expensive. They also require relatively large quantities of electric current.

It is the object of the invention to design a filter for eliminating slow hydraulic pressure fluctuations, which filter is rugged and simple and does not use electric current. According to the invention, this object is achieved by (a) a hydraulic accumulator unit having a volume variable against the force of a spring and
(b) a restrictor by means of which the hydraulic accumulator unit is connected to the liquid subjected to the pressure fluctuations.

Further modifications of the invention are subject matter of the sub-claims.

Some embodiments of the invention will now be described in greater detail with reference to the accompanying drawings.

Figure 1:
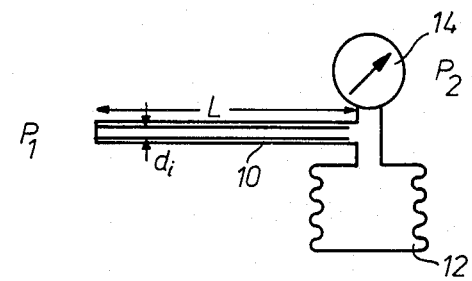
FIG. 1 shows schematically a first embodiment of the filter having a capillary and a bellows.

In the embodiment of FIG. 1, a capillary tube 10 having an inner diameter of $d_i$ and a depth of L is provided as restrictor. The capillary tube 10 connects the space containing the fluid submitted to the pressure fluctuations and having an initial pressure of $P_1$ to a hydraulic accumulator unit formed by an elastic bellows 12. The pressure $P_2$ within the bellows 12 is measured by a pressure measuring instrument 14.

With laminary flow through the capillary 10 having inner diameter $d_i$ and having length L, the differential pressure is $$P_1 - P_2 = \frac{32 \cdot \eta \cdot L \cdot \bar{v}}{d_i^2}, \quad (1)$$

$\eta$ being the dynamic viscosity and $\bar{v}$ being the average speed. As an element of the liquid $$dV = \frac{\pi \cdot d_i^2}{4} \cdot \bar{v} \cdot dt = \frac{\pi \cdot d_i^4 (P_1 - P_2) dt}{18 \cdot \eta \cdot L} \quad (2)$$

enters the bellows 12 during the time interval dt due to the pressure drop, a pressure change of $$dP_2 = \frac{dV}{Cv_p} = \frac{P_1 - P_2}{\tau} \cdot dt \quad (3)$$

in the bellows 12 results in accordance with the Hagen-Poiseuille law, $Cv_p$ being the specific volume change (due to the pressure change) of bellows 12.

If equation (3) is somewhat transformed, the equation $$\tau \cdot \frac{dP_2}{dt} + P_2 = P_1 \quad (4)$$

is obtained revealing that the present arrangement is a first order filter. The time constant of this arrangement results from equation (2) as $$\tau = \frac{128 \cdot \eta \cdot L \cdot Cv_p}{\pi \cdot d_i^4} \quad (5)$$

From equation (5) it can be seen that the time constant depends very much on the inner diameter of the capillary.

After selection of the time constant required which depends on the attenuation required and on the lowest frequency to be eliminated, and after having chosen a suitable bellows, the dimensions of the capillary tube 10 may be calculated in accordance with equation (5), and a suitable capillary tube can be chosen. The filter is lossfree. It protects the pressure measuring instrument proper against too high, unadmissable pressure peaks.

Figure 2:
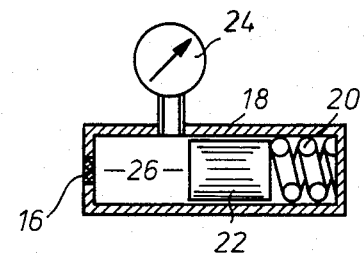
FIG. 2 shows in longitudinal section a second embodiment of the filter having sintered material and a spring-loaded piston.

FIG. 2 shows an embodiment in which the restrictor is formed by a sintered material 16, and the hydraulic accumulator is formed by a cylinder 18, in which a piston 22 loaded by a spring 20 is movable. The pressure measuring instrument 24 is connected to the cylinder chamber 26 formed between sintered material 16 and piston 22.

Figure 3:
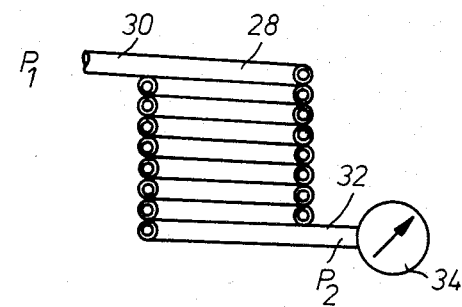
FIG. 3 shows a third embodiment of the filter, in which embodiment an elastic hose simultaneously serves as restrictor and accumulator unit.

In the embodiment of FIG. 3, restrictor and accumulator unit are combined in the form of a thin, elastically expandable hose 28. The initial pressure $P_1$ subjected to the pressure fluctuations is applied to the one end 30 of the hose 28. The pressure measuring instrument 34 is connected to the other end 32. On one hand, the hose 28 acts as a restrictor similar to capillary tube 10. On the other hand it forms a volume which is filled with liquid and which expands if pressure is increased. Thereby, hose 28 also acts as a hydraulic accumulator unit similar to the bellows 12 of FIG. 1. Therefore, an effect similar to that of FIG. 1 may be caused if length and diameter of the hose 28 are suitably chosen.

Figure 4:
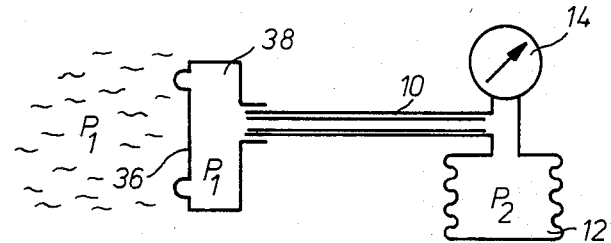
FIG. 4 shows a forth embodiment similar to that of FIG. 1, in which embodiment provisions have been made to prevent the capillary from getting choked.

Similar to FIG. 1, the arrangement of FIG. 4 is provided with a capillary tube 10 as restrictor, a bellows 12 as accumulator unit and the pressure measuring instrument 14. Here, however, the restrictor 10 is, on its inlet side, connected to a chamber 38 which is filled with liquid and closed by a diaphragm 36, the outer surface of which is exposed to the medium subjected to the pressure fluctuations.

Thus, the medium subjected to the pressure fluctuation, such as sea water, does not enter the capillary tube 10 and cannot choke it. Furthermore, it is possible to fill chamber 38, capillary tube 10 and bellows 12 with a viscous fluid and to thus increase $\eta$ in equation (5).

There are other ways as well to combine the different types of restrictors and hydraulic accumulator units. Chamber 38 and diaphragm 36 may also be provided in a system according to FIG. 2. Finally, it is also possible to series connect a plurality of such filters to produce a higher order filter.

Figure 5:
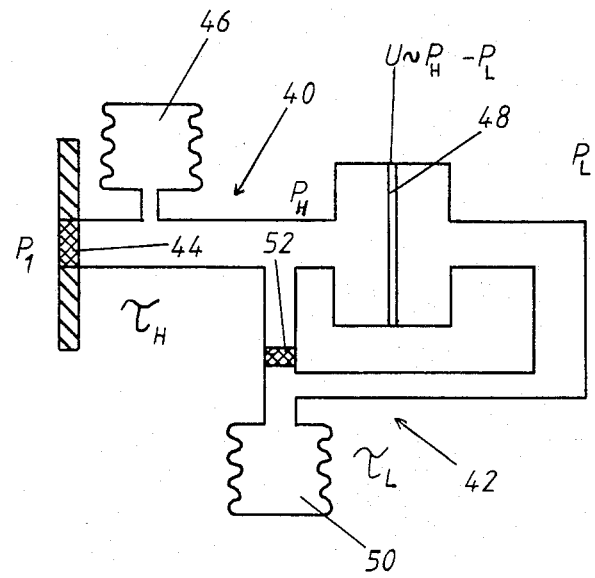
FIG. 5 shows a fifth embodiment of the filter according to the invention.

If a determined intermediate frequency band of pressure fluctuations is to be evaluated or measured, thus if frequencies above and below an interesting range are to be suppressed or eliminated, this may be achieved by an arrangement shown in FIG. 5. Two low-pass filters are constructed, namely a low-pass filter 40 having a relatively high limiting frequency and a time constant of $\tau_H$, and a low-pass filter 42 having a relatively low limiting frequency and a time constant of $\tau_L$. The low-pass filter 40 in this embodiment consists of a restrictor 44 and a hydraulic accumulator unit 46. The pressure of the hydraulic accumulator unit 46 acts on one side of a differential pressure transmitter 48. The low-pass filter 42 is formed by a hydraulic accumulator unit 50 which is connected to the hydraulic accumulator unit 46 of the low-pass filter 40 through a restrictor 52. Restrictors 44 and 53 are depicted as sintered discs in FIG. 5. The pressure of the hydraulic accumulator unit 46 be $P_H$, the pressure of the hydraulic accumulator 50 be $P_L$, and the pressure at the entrance of the filter be $P_1$. If s is the Laplace operator, this yields $$P_H = P_1 \frac{1}{1 x_H \cdot s}$$

$$P_L = P_H \frac{1}{1 + \tau_L s} = P_1 \cdot \frac{1}{(1 + \tau_H s)(1 + \tau_L s)}.$$

The differential pressure transmitter generates a voltage $$U \sim P_H - P_L = P_1 \left[ \frac{1}{1 + \tau_H s} - \frac{1}{(1 + \tau_H s)(1 + \tau_L s)} \right]$$

or $$U \sim P_1 \frac{\tau_L s}{1 + s(\tau_H + \tau_L) + \tau_H \tau_L s^2}.$$

This is the transfer function of a band-pass.

The function of the filter may also be understood, when the structure of the filter is considered.

Slow fluctuations of the pressure $P_1$ below the low limiting frequency of filter 42 are transmitted by both of the filters 40 and 42. Therefore, no differential pressure and thus no output signal appears at the differential pressure transmitter 48. If the frequency of the fluctuations is below the limiting frequency of filter 40 and above the limiting frequency of filter 42, the fluctuations still become effective through filter 40 at the differential pressure transmitter 48. They are not transmitted, however, by filter 42 such that there is no compensation at the differential pressure transmitter 48. The differential pressure transmitter produces an output signal corresponding to the fluctuations. Pressure fluctuations of higher frequency above the limiting frequency of the filter are suppressed by filter 40 and do not become effective at the differential pressure transmitter.

Instead of a differential pressure transmitter two simple pressure transmitters may be provided, the difference of the output signals being formed electrically.

I claim:

1. An apparatus for measuring a range of pressure fluctuations in a liquid subjected to pressure fluctuations within said range and outside of said range comprising,
    a differential pressure transmitter,
    a first low-pass hydraulic filter including a first hydraulic accumulator and a first restrictor, said accumulator communicating with one side of said transmitter and through said first restrictor to the liquid subjected to pressure fluctuations, said first filter blocking the passage of pressure fluctuations to said transmitter above a predetermined frequency,
    a second low-pass hydraulic filter including a second hydraulic accumulator and a second restrictor, said accumulator communicating directly with the other side of said transmitter, and with said one side of said transmitter and said first accumulator through said second restrictor, and second filter blocking the passage of pressure fluctuations to said transmitter below a predetermined frequency lower than that of said first filter,
    wherein said transmitter measures the range of pressure fluctuations between the frequencies of said filters and suppresses fluctuations above and below said range.

2. The hydraulic filter of claim 1, wherein each restrictor includes a capillary tube.

3. The hydraulic filter of claim 1, wherein each restrictor inclues a fluid permeable sintered material.

4. The hydraulic filter of claim 1, wherein said liquid is confined in a diaphragm, the outer surface of which is exposed to a second liquid generating the pressure of fluctuations and transmitting same through said diaphragm to said first mentioned liquid.

* * * * *